Patented Oct. 31, 1939

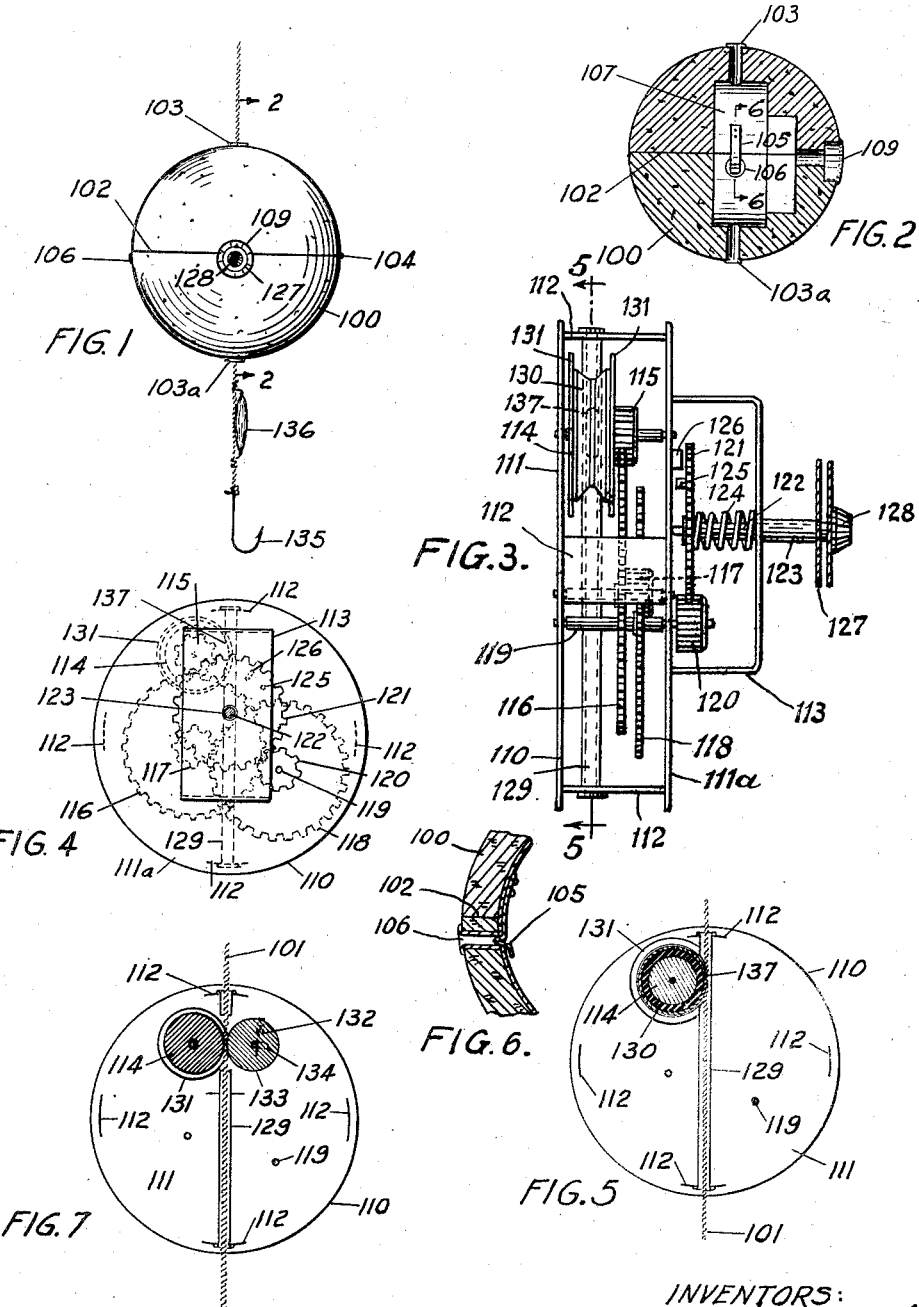
Oct. 31, 1939.  H. K. FAIRBANKS ET AL  2,177,697
FLOAT FOR USE ON FISHING LINES
Filed Feb. 23, 1937

2,177,697

UNITED STATES PATENT OFFICE 2,177,697

FLOAT FOR USE ON FISHING LINES

Herbert K. Fairbanks, Manchester, and Herbert Bachrach, Hartford, Conn.

Application February 23, 1937, Serial No. 127,062

11 Claims. (Cl. 43—15)

In floats of like nature heretofore used, a solid body of cork is provided, with means for fastening same securely to the fishing line. The position on the line at which said float is attached is determined by the depth below the surface at which the angler wishes his lure to be held suspended. In actual use, this type of float prevents the winding up on the reel of any of the line which is between the float and the lure after the float is drawn up to the rod tip and the lure is left suspended at the end of a length of the fishing line.

With the lure thus suspended, it is impossible for the angler to cast the same to any considerable distance from his position, and many fertile fishing areas may thus remain inaccessible to him. In these floats, also, it is necessary to unfasten the same from the line and move said float to a new position on the line and re-fasten whenever the angler wishes to change the depth of suspension of his lure.

Our invention overcomes the inherent disadvantages in other floats by providing a body of cork, or other buoyant material, having within it a formed recess containing a removable mechanism through which the fishing line passes without being immovably attached thereto, thereby permitting all the line to be wound in on the reel, and the lure and float to be brought together close to the rod tip. With the lure and float thus held, it becomes possible for the angler to cast the same accurately and to considerable distances from his position.

Our invention contemplates the provision of a float of this type which is not immovably attached to the fishing line but through which the line can be drawn and so allow the float and lure to be brought close together at the rod tip thus making it possible to cast the float and lure as a unit after the manner generally employed in the developed art of bait casting so that upon striking the water together, the former, because of its buoyancy, floats thereon and allows the lure to sink below the surface by its own weight to a predetermined depth, and thereafter holds said lure suspended at this constant depth until same is taken by a fish or retrieved by the angler.

Our invention further contemplates the provision of a novel means for controlling the length of line which may be drawn through our float and means for the predetermination of the depth of suspension of the lure beneath the surface of the water.

Our invention further contemplates the provision of a float of this type which is simple in construction and adapted to being inexpensively produced and which is efficient in operation.

Our invention further contemplates the provision of a float with the novel characteristic of disposing all the mechanism within the surface of the float, permitting of no projection without its surface to entangle the fishing line or to which seaweed or other growths might become attached.

The operation of our invention will be clear from the description which follows and from the drawing in which;

Figure 1 is an elevation view of our float, mounted on a fishing line;

Figure 2 is a cross section through the float taken on line 2—2 of Fig. 1, to show the formed recess within the body and the tubular passages from same to the outer surface, but with the mechanism removed.

Figure 3, drawn to enlarged scale, is a side elevation of the mechanism only, removed from the body;

Figure 4, drawn to enlarged scale, is a side elevation of the mechanism as it appears with indicator knob and dial removed;

Figure 5, drawn to enlarged scale, is a cross section of the mechanism taken on the line 5—5 of Fig. 3 to show the path of the line through same and manner in which movement of the line causes a positive rotary motion of drive wheel;

Figure 6, drawn to enlarged scale, is a part cross section taken on line 6—6 of Fig. 2 to show the catch, 105, and aperture, 106.

Figure 7, drawn to enlarged scale, is a cross section of the mechanism taken on line 5—5 of Fig. 3 to show one modification of our device.

Referring now to the drawing and particularly to Figures 1, 2, 3, 4, 5 and 6, our float is provided with a body, 100, of cork or other material of low specific gravity, having a shape which is symmetrical about a vertical axis, and here shown spherical. Said body is split into two parts on line, 102, and securely connected together by suitable means, as, for instance, by hinge, 104, and catch, 105, (Fig. 6) so that said parts easily can be separated and reconnected. Catch, 105, is released by inserting a small stick or wire through aperture, 106, in body of float, 100.

Formed within the body, 100, is recess, 107, with tubular passages, 103 and 103a, leading therefrom to the outer surface, through which the fishing line, 101, enters and leaves. Groove, 108, extends laterally from recess, 107, to the outer surface of body, 100, ending in circular depression, 109.

Referring now particularly to Figures 3, 4 and 5, the mechanism unit, 110, has a framework comprised of cheek plates, 111 and 111a, separated and held in correct position by bars, 112, and of bridge, 113, carrying guide member, 123, at the outer end of which is dial, 127.

Journaled in cheek plates, 111 and 111a, are shafts on which are mounted gears and pinions operatively intermeshed to give a rotary motion in every member of the train when the driving member, 114, is rotated. Drive wheel, 114, is a grooved wheel having a suitable face width, said face being composed of a resilient material, 130, as, for instance, cork or rubber, and set between side flanges, 131, which prevent the line from passing off the sides of the grooved wheel.

Disposed opposite the drive wheel, 114, is tubular guide, 129, which has an aperture, 137, in its side at its point of tangency to drive wheel, 114, said tubular guide being firmly supported by suitable means, as, for instance, by bars, 112, in the mechanism frame.

The path of the line through the mechanism, as indicated in Figure 5, is downward through tubular guide, 129, to aperture 137, in said guide, thence through said aperture and one turn in a clockwise direction around face of drive wheel, 114, thence in through the aperture, 137, and downward through tubular guide, 129, to the open. It is thus readily seen that tensioning the line, 101, makes a bight on drive wheel, 114, and that any longitudinal movement of the line in either direction positively causes rotation of drive wheel, 114, and, consequently, a positive motion of rotation throughout the entire connected gear train.

Set on same shaft with wheel, 114, is pinion, 115, which meshes with gear, 116, carried on the same shaft with pinion, 117, which meshes with gear, 118. Fixed on the end of shaft, 119, which carries gear, 118, is pinion, 120, which meshes with a selector gear, 121.

Selector gear, 121, is fixed near the end of shaft, 122, which rotates in, and is longitudinally movable in, guide, 123. At the outer end of shaft, 122, is indicator knob, 128, which moves over face of dial, 127. Compression spring, 124, around shaft, 122, bears against bridge, 113, and selector gear, 121, thus holding selector gear, 121, in mesh with pinion, 120, and end of shaft, 122, in bearing against cheek plate, 111a.

By pulling on knob, 128, shaft, 122, moves longitudinally in guide, 123, disengaging selector gear, 121, from pinion, 120, and compressing spring, 124. It is then possible to rotate selector gear, 121, in either direction as desired. Upon releasing knob, 128, spring, 124, expands, forcing selector gear, 121, again into engagement with pinion, 120, and causing end of shaft, 122, to bear against side plate, 111a.

On the side of selector gear, 121, near its periphery, is attached projection, 125. Attached to side plate, 111a, is stop, 126, so disposed, that it is in the path of rotation of projection, 125, on selector gear, 121, when selector gear, 121, is in engagement with pinion, 120, and so will prevent a complete revolution of selector gear, 121, when same is engaged with pinion, 120, but will not prevent a complete revolution of selector gear, 121, when same is disengaged from pinion, 120.

It will be apparent that in the mechanism described, a definite constant angular movement of selector gear, 121, is caused by each revolution of drive wheel, 114. It will further be apparent that equal lengths of line drawn through the mechanism will cause equal rotation of drive wheel, 114, and consequent equal angular movements of selector gear, 121, and of projection, 125, attached thereto, and of pointer knob, 128, which moves over the face of dial, 127.

To provide means for measuring the length of line drawn through the mechanism, dial, 127, is suitably divided by markings to indicate equal arcs of rotation of indicator knob, 128, said equal arcs being made to correspond to some definite length of line drawn through the mechanism, as, for instance, one foot. A zero point is marked on dial, 127, under the position taken by the pointer on knob, 128, when projection, 125, is in contact with stop, 126.

To assemble for use, float body, 100, is opened and free end of line, 101, is passed inward through tubular passage, 103, to recess, 107, thence through tubular guide, 129, of mechanism, 110, to aperture, 137, in side of same, thence through aperture and one turn in a clockwise direction around drive wheel, 114, thence in through aperture, 137, of guide, 129, and downward through same, thence through tubular passage, 103a, to the exterior of float body, 100. With the line thus held, mechanism, 110, is placed in recess, 107, so that ends of tubular guide, 129, are disposed before tubular passages 103 and 103a, and so that guide, 123, lies in groove, 108, with dial, 127, and pointer knob, 128, in circular depression, 109. The two parts of float body, 100, are then closed together and fastened firmly by snap catch, 105. To the free end of line, 101, lure, 135 (and sinker, 136, if used) is then attached.

In operation, the float is held with the lure drawn close thereto and knob, 128, is pulled out, selector gear, 121, thus being disengaged from pinion, 120, and spring, 124, compressed. Selector gear, 121, thus disengaged, may be rotated by pointer knob, 128, until pointer on same is over some mark on dial, 127, say, five divisions from the zero point. Pull on knob, 128, is then released, and spring, 124, expands, forcing selector gear, 121, into engagement with pinion, 120.

Line, 101, can then be drawn downward through mechanism, 110, by weight of lure, 135, said line making a bight on drive wheel, 114, and producing in it a positive rotation. Rotation of drive wheel, 114, produces a positive rotary motion in each of the component parts of the connected train of gears, and positive rotation of selector gear, 121.

It will be apparent that upon the passage of five feet of line through the float (the case now illustrated) selector gear, 121, will have rotated through an arc equal to five times the arc executed by same due to the passage of one foot of line, and projection, 125, will have encountered stop, 126, which will immediately arrest the rotary motion of selector gear, 121, and the component parts of the entire gear train, including drive wheel, 114, and movement of line, 101, through float and mechanism, 110, will cease, and float, 100, will thereafter be held firmly to line, 101, due to bight of said line on face of drive wheel, 114, until the direction of pull on line, 101, is reversed, or until selector gear, 121, is disengaged from pinion, 120, by pulling out on knob, 128.

We prefer to use a drive wheel having a facing of some resilient material, as, for instance, cork or rubber, which prevents slipping of line, 101, on same when motion of said line through mechanism, 110, is arrested by contact of projection, 126, with stop, 125. We do not wish, however, to be limited to the use of the particular materials mentioned, for others, we find, will give satisfactory results.

The rotary motion of the drive wheel, 114, due to the passage of line, 101, through the mechanism, 110, may be accomplished in various other ways, as for instance, in the manner disclosed in Figure 7, in which drive wheel, 114, has a flat face, against which bears wheel, 133, also having a flat face, carried on a shaft which is journaled in slotted bearings, 134, in cheek plates, 111 and 111a. Wheel, 133, is urged against face of drive wheel, 114, by springs, 132. To use, line, 101, is passed between the contact surfaces of wheel, 133, and drive wheel, 114, and it is apparent that movement of line, 101, will produce a positive rotary motion of drive wheel, 114, and consequent positive rotary motion in the attendant gear train. In operation, the motion of line, 101, through the mechanism causes positive rotation of drive wheel, 114, and component parts of gear train, including selector gear, 121, as heretofore described.

It will be seen that we have provided a float for use principally on fishing lines in which is a mechanism which, in a novel manner, allows a predetermined amount of line to be drawn through same before movement of line through same is arrested and further movement in that direction thereafter prevented, and a novel means for the predetermination of the length of line which may be drawn through before motion of same is arrested.

It will be further seen that we have provided a device that is simple in construction and cheap to manufacture.

While we have shown a particular embodiment of our invention it will be understood that modifications can be made in the construction of the device by one skilled in the art without departing from the scope of the invention.

We claim:

1. In a fishing device of the character described, a body of cork, divided in two parts, hinged and operable to give access to an interior recess for the insertion and removal of a mechanism, and means for securing said parts firmly together, entrance and exit openings for a fishing line, a mechanism through which the fishing line passes without being immovably attached thereto, said mechanism being adapted to be positively operated by movement of said line in either direction, and means for positively and accurately controlling and limiting movement of the fishing line through the float.

2. In a device of the character described, a body of cork symmetrically shaped about one axis, enclosing a mechanism with openings in the body leading to the mechanism for the entrance and exit of a fishing line, and a depression in the surface of the body of the float to receive indicator dial and adjusting knob of the mechanism.

3. In a device of the character described, a mechanism having a selector gear mounting a projection, said selector gear being held in engagement with its driving pinion by a compression spring disposed about the shaft of the selector gear, said shaft also mounting an indicator knob and being longitudinally and rotatively movable in its bearing, such that tensional pull outward on the knob causes compression of the spring and disengagement of the gear from its driving pinion, so that said gear can be freely rotated to any position on its circle of revolution.

4. In a device of the character described, a body divided in two sections removably secured together and having an interior recess, a mechanism disposed in the interior recess, entrance and exit openings for a fishing line, a depression in the body surface for receiving a graduated dial, and an indicator knob adapted to being set at any desired point rotatively on the dial, said dial and indicator knob being part of the mechanism.

5. In a device of the character described, a mechanism having a grooved drive wheel which positively engages a train of gears, and a tubular guide having an aperture on one side, disposed tangent to the drive wheel such that the aperture is at the point of tangency, for leading a fishing line smoothly to and from the grooved wheel.

6. In a device of the character described, a mechanism having a drive wheel positively operative by the movement of a fishing line through the mechanism and which positively engages a train of gears and pinions, the last driven gear of which mounts a projection for engaging a stop.

7. In a device of the character described, a mechanism comprising a frame mounting tubular guides for leading a fishing line smoothly to a grooved drive wheel, a train of pinions and gears positively operatively engaged with said drive wheel, and a selector gear adjustable to any position rotatively and carrying a projection adapted to engage a fixed stop disposed in its path.

8. In a device of the character described, a mechanism comprising a drive wheel, an engaged gear train, and a selector gear mounting a projection, a stop mounted on the frame of the mechanism disposed in the path of rotation of the projection adapted to prevent a complete revolution of the selector gear when same is engaged with its driving pinion.

9. In a device of the character described, a mechanism having a selector gear mounting a projection, and said selector gear being held in engagement with its driving pinion by a compression spring disposed about the shaft of the selector gear, said shaft also mounting an indicator knob and being longitudinally and rotatively movable in its bearing, such that tensional pull outward on the knob causes compression of the spring and disengagement of the gear from its driving pinion, so that said gear can be freely rotated to any position on its circle of revolution.

10. In a device of the character described, a mechanism comprising a drive wheel rotatively mounted for movement in both directions and adapted to receive one turn of a fishing line, tubular guides for leading said fishing line to and from the drive wheel, a train of pinions and gears operatively engaged with the drive wheel, the last gear in the train being a selector gear disengageable from its driving pinion and adjustable rotatively and carrying a projection; a stop mounted on the mechanism frame disposed in the path of rotation of said projection such that said selector gear is prevented from making a complete revolution while operatively engaged with its driving pinion, a compression spring disposed about the shaft carrying the selector gear to hold said gear in operative engagement with its driving pinion, a guide bearing in which shaft carrying selector gear is operative both rotatively and longitudinally, attached at one end to the mechanism frame and mounting at its other end a graduated dial, and an indicator knob mounted on the end of shaft carrying selector gear adapted to being tensioned to disengage selector gear from its driving pinion and to rotate same to any desired position on its path of rotation, the position selected being indicated by the position of the indicator knob over the graduated dial.

11. In a device of the character described, a mechanism comprising a grooved face drive wheel positively operatively engaging a train of pinions and gears engaging a selector gear adapted to being disengaged from its driving pinion and operative while thus disengaged to any position, rotatively, a projection carried by selector gear adapted to engage a fixed stop disposed in its path of rotation, a compression spring adapted to hold selector gear in engagement with its driving pinion, and an indicator knob on the shaft of said selector gear, said knob being movable over the face of a graduated dial adapted to indicate positively the position of projection on selector gear with respect to the fixed stop.

HERBERT K. FAIRBANKS.
HERBERT BACHRACH.